United States Patent [19]

Schaefer

[11] Patent Number: 5,557,418
[45] Date of Patent: Sep. 17, 1996

[54] VIDEO TAPE FORMAT FOR PROVIDING SPECIAL EFFECTS CAPABILITIES

[75] Inventor: Louis F. Schaefer, Palo Alto, Calif.

[73] Assignee: Samsung Electronics Co., Ltd., Kyungki-do, Rep. of Korea

[21] Appl. No.: 164,833

[22] Filed: Dec. 9, 1993

Related U.S. Application Data

[63] Continuation of Ser. No. 817,622, Jan. 7, 1992, abandoned.

[51] Int. Cl.$^6$ .............................. H04N 5/783; H04N 5/84
[52] U.S. Cl. .......................... 358/335; 358/312; 358/347
[58] Field of Search .................................... 358/335, 342, 358/312, 347; 369/97, 32, 96; 360/10.1, 33.1; H04N 5/84, 5/783

[56] References Cited

U.S. PATENT DOCUMENTS

| | | | |
|---|---|---|---|
| 3,809,806 | 5/1974 | Walker et al. | 369/97 |
| 4,280,147 | 7/1981 | Baldwin | 360/33.1 |
| 4,361,849 | 11/1982 | Bolger | 358/312 |
| 4,567,585 | 1/1986 | Gelbart | 369/97 |
| 4,669,070 | 5/1987 | Boll | 358/335 |
| 4,858,030 | 8/1989 | Oku et al. | 358/312 |
| 4,873,587 | 10/1989 | Yoshimura et al. | 358/312 |
| 4,963,992 | 10/1990 | Doi et al. | 358/335 |
| 5,255,102 | 10/1993 | Fushiki | 358/312 |
| 5,343,458 | 8/1994 | Schaefer et al. | 358/335 |
| 5,363,200 | 11/1994 | Frohbach et al. | 358/335 |

*Primary Examiner*—Thai Q. Tran
*Assistant Examiner*—Huy Nguyen
*Attorney, Agent, or Firm*—Burns, Doane, Swecker & Mathis

[57] ABSTRACT

Digital video information recorded on a recording medium is read from the medium by scanning a fraction of a video signal field stored on the recording medium during a scan cycle over the recording medium, reading data during the scan cycle, which data includes video signal information and video signal identification information, and storing at least a portion of the video signal information in a field memory at a location identified by the video signal identification information.

16 Claims, 2 Drawing Sheets

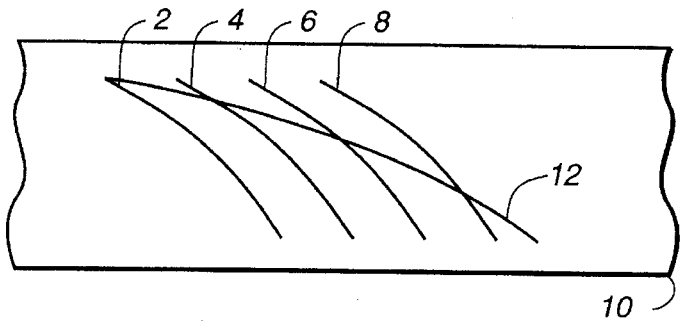
FIG._1
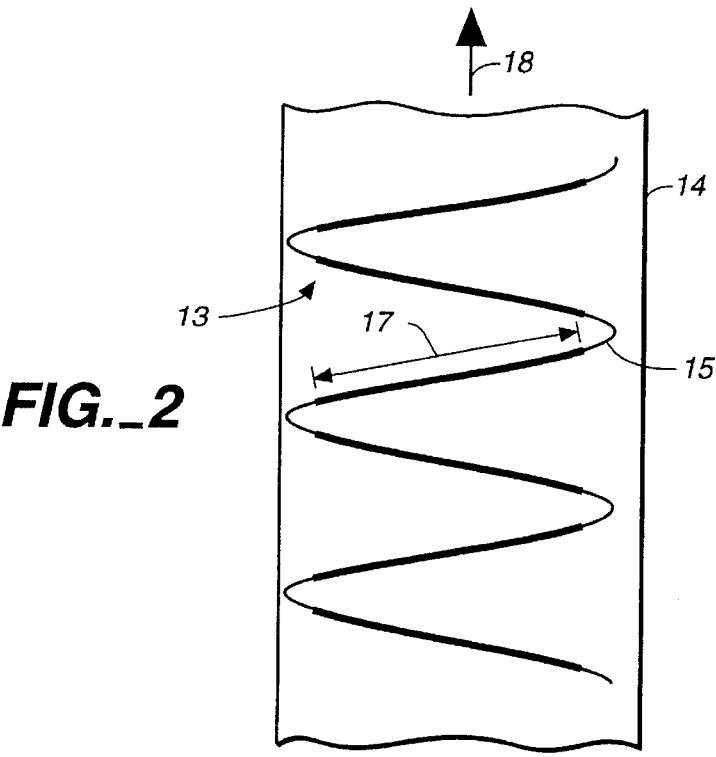
FIG._2
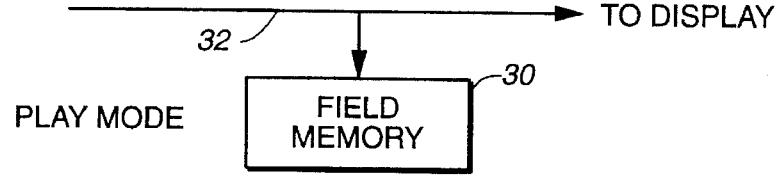
FIG._4a  PLAY MODE
FIG._4b  FREEZE FRAME
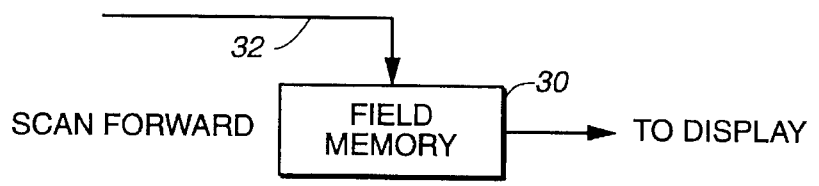
FIG._4c  SCAN FORWARD

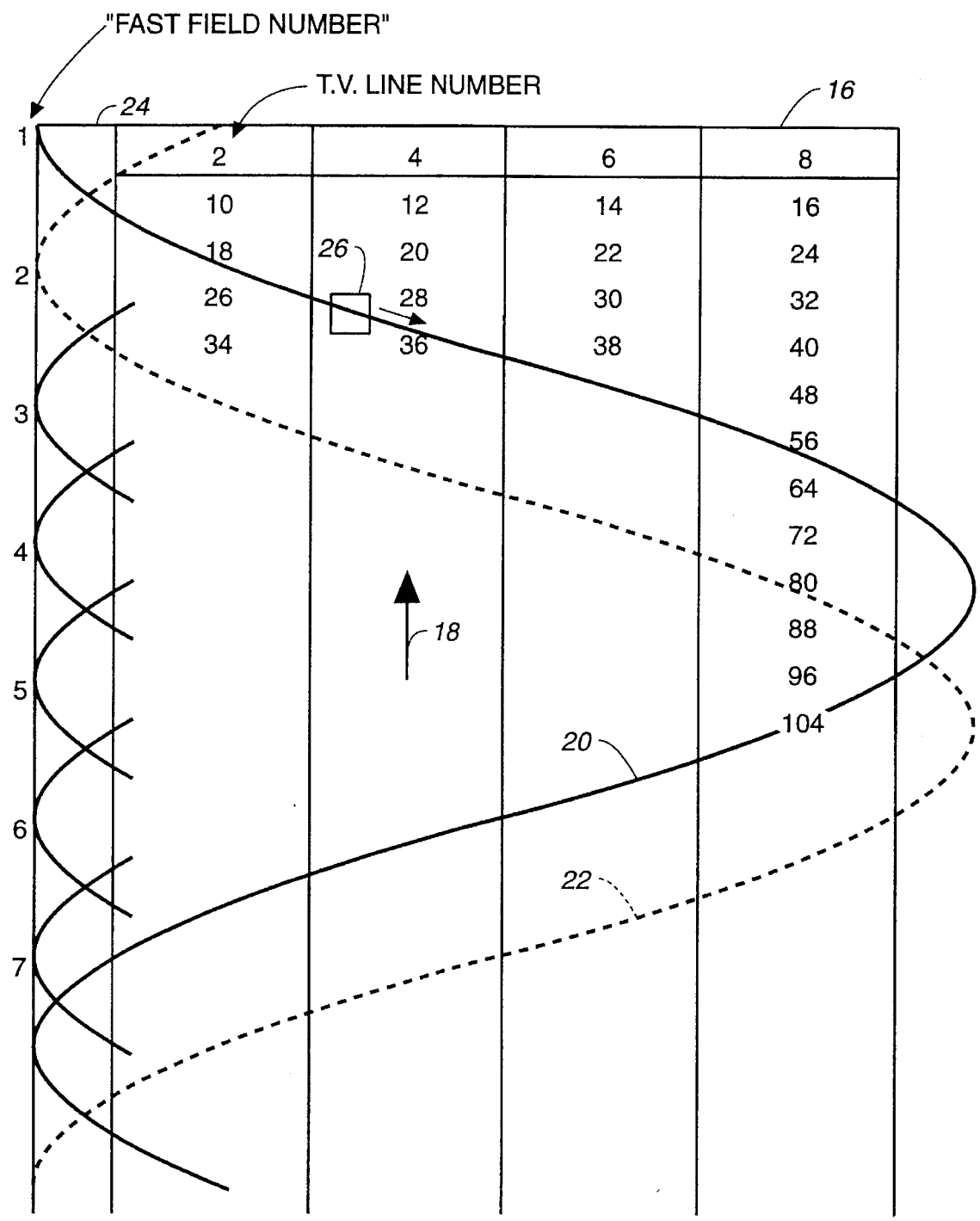
FIG._3

VIDEO TAPE FORMAT FOR PROVIDING SPECIAL EFFECTS CAPABILITIES

This application is a continuation, of application Ser. No. 07/817,622, filed Jan. 7, 1992, abandoned.

BACKGROUND OF THE INVENTION

1. Field of the Invention

The present invention generally relates to video recording systems and, more particularly, to systems for providing video special effects during playback of recorded video information.

2. State of the Art

Generally speaking, television pictures are comprised of snapshot-like "frames" that contain video signal information in horizontal scan lines organized by synchronizing signals. For example, according to the standards of the National Television Systems Committee (NTSC), each frame of video information comprises 525 horizontal scan lines. Further according to NTSC standards, the frame repetition rate is thirty frames per second, or 15,750 horizontal scan lines per second.

In practice, all of the video information in a complete television frame is not reproduced at a receiver simultaneously; instead, a technique known as interlaced scanning is used to reduce flicker. In interlaced scanning, each frame of video information is divided into two interlaced fields, each comprising a raster array of odd numbered or even numbered horizontal scan lines. Thus, if the horizontal scan lines of a 525-line NTSC frame were numbered sequentially from the top of a raster array, an odd-line field would comprise numbered horizontal scan lines 1, 3, 5, and so forth through frame line 525. Similarly, an even-line field would include numbered lines 2, 4, and so forth through line 524. According to the NTSC format, the field repetition rate is sixty fields per second.

In video recording systems that employ magnetic videotape as the recording medium, it is conventional to record each television field by using only a single track on the recording medium as traced by a recording head of the helical type. (Helical recording heads are widely used because they provide high head-to-tape speed, usually exceeding one meter per second, with relatively slow moving tape.) Thus, FIG. 1 shows an example of four fields of video information recorded in parallel tracks 2, 4, 6 and 8, respectively, which extend at a small angle relative to the longitudinal edge of a magnetic videotape 10.

It is well known, of course, that videotape recorders can provide special effect capabilities. One common special effect is a "still" feature that "freezes" a recorded television frame for viewing during playback. Other common special effects include "slow" and "fast" scan features. A slow scan feature, which enables a viewer to scan through recorded video information at speeds slower than normal playback speeds, is obtained by reducing the relative speed between a playback head and magnetic videotape.

A fast scan feature, which enables a viewer to scan through recorded video information at speeds faster than normal playback speeds, is obtained by increasing the relative speed between a playback head and a magnetic videotape. For instance, FIG. 1 illustrates the case of a fast scan of a magnetic videotape by a helical playback head that follows an accelerated path 12. In practice, fast scans often distort moving images and changing scenes because, as shown in FIG. 1, the playback head picks up information from different tracks (i.e., fields) during the fast scan.

SUMMARY OF THE INVENTION

Generally speaking, the present invention relates to systems for implementing special effects such as still, slow scan and fast scan of recorded video information. In one preferred embodiment, the present invention provides a method for reading digital video information from a recording medium by scanning a fraction of a video signal field stored on the recording medium during a scan cycle over the recording medium, reading data during the scan cycle (which data includes video signal information and video signal identification information), and storing at least a portion of the video signal information in a field memory at a location identified by the video signal identification information.

BRIEF DESCRIPTION OF THE DRAWINGS

Other aspects of the present invention will become more apparent from the following detailed description of the preferred embodiments as described in conjunction with the accompanying drawings, in which:

FIG. 1 shows, as discussed above, a fast scan trace of a playback head in a conventional video recording system;

FIG. 2 shows sinusoidal traces for recording and reading video information;

FIG. 3 shows a trace over recorded tracks of video information which results in an exemplary fast-forward special effect mode; and FIGS. 4(a)–(c) show use of a field memory to implement special effect modes of operation.

DETAILED DESCRIPTION OF THE PREFERRED EMBODIMENTS

FIG. 2 shows an example of a generally sinusoidal trace 13 formed by a laser beam which is directed by a torsional, resonant-mirror galvanometer to travel across an optical recording tape 14 which moves slowly in the direction of arrow 18. It should be noted that video signal information can be recorded in both directions across the tape. In other words, recording can be done from left to right, and then from right to left across the tape.

With regard to FIG. 2, it should be understood that the torsional galvanometer inherently provides non-continuous recording; that is, recording takes place when the laser beam traces over the recording medium, but does not occur during those periods, at the end of each trace, when the scanning motion of the laser beams is stopped and then reversed in direction. Thus, "active" portions 17 of sinusoidal trace 13 can be defined as those portions of the trace during which the tracing velocity is more than one-half of its value at the center of the trace. In practice, the active portion of each trace occupies about 87 percent of the peak-to-peak amplitude of the trace and represents a duty cycle of approximately 67 percent. Television video information, encoded in digital form, can be recorded in the active portions 17. The other portions of the traces are recorded at speeds which are too low for recording high frequency video signals, but can be used for recording low frequency information.

Still further with regard to FIG. 2, it should be noted that the active portions 17 are nearly perpendicular to the longitudinal edges of tape 14. This orientation of recorded video information can be contrasted to the recorded tracks in FIG. 1 which are substantially non-perpendicular to the longitudinal edges of the tape. As will be explained in the following, the near-perpendicular orientation of the traces allows improved implementation of special effects such as still, slow scan and fast scan of recorded video information.

FIG. 3 illustrates a formatting layout wherein recorded information is divided—spatially and temporally—between video, audio, and control information on optical recording tape 14. It should be understood that an optical deflection mechanism, such as the resonant-mirror galvanometer described above, can be used to record video information in active portions 17 of traces that extend substantially horizontally across the tape. Thus, in the exemplary embodiment shown, the video information recorded on each active portion 17 comprises an integral number of the horizontal scan lines of a television field. More particularly, the first horizontal active portion 17 includes four horizontal scan lines 2, 4, 6, and 8 from an even field of a television video frame; the second horizontal active portion includes four subsequent horizontal scan lines 10, 12, 14, and 16 from the same field.

Also with regard to FIG. 3, it should be understood that the left and right ends of each of the active scan portions are used to record low frequency control data. The low frequency data can include, for example, information that identifies the line number of the first horizontal scan line stored in the active scan portion following the data. Also, audio information for accompanying the recorded video information can be encoded in digital form and recorded at the left and the right ends 13 and 15 of each of the active scan portions.

FIG. 3 also shows the fast-forward scan path 20 that a playback head 26 would could trace along tape 14. In the illustrated embodiment, by way of example, the velocity of the fast-forward scan is approximately ten times faster than the normal velocity of the recording head. During the illustrated fast-forward scan, the playback head moves over portions of the horizontal scan lines 18, 26, 28, 36 and so forth.

With FIG. 3 in mind, it can be understood that the relative speed between the playback head and optical tape 14 can be selected so that all of the horizontal scan lines in frames of video information which are recorded on the tape are read once before any one horizontal scan line is read twice. For example, when the fast-scan playback velocity is approximately ten times faster than normal playback, about twenty frames of video information are traced by the playback head in order to read all horizontal scan lines at least once.

It can now be understood that the low-frequency information which is recorded at the beginning and/or end of each active scan on the optical tape permits the playback head to identify the horizontal scan lines which are read. Further, as the playback head skips from horizontal scan line to horizontal scan line (e.g., from line 18 to line 36), the playback system will deduce, based on the tape speed selected, that it has skipped over several horizontal scan lines. The deduced and detected information can be used, as will be described below in conjunction with FIGS. 4(a)–(c), for improving the clarity of television special effect features.

In FIGS. 4(a)–(c), the system includes a field memory 30 which contains addressable locations for storing video information from each of the even and odd horizontal scan lines of a complete frame of video information. As shown, the field memory can be used in three different modes of operation: a normal playback mode, a still special effect mode, and fast-forward scan mode.

In the normal playback mode, illustrated in FIG. 4(a), the playback head moves along an optical tape at the same speed as the recording head, and recorded video information is read from each of the recorded lines on the tape. More particularly, for the example discussed above in conjunction with FIG. 3, the playback head first reads horizontal scan lines 2, 4, 6 and 8 from the first recorded active portion and next reads horizontal scan lines 16, 14, 12 and 10 (in that order) from the second recorded active portion. The read mechanism buffers the information read and the buffered information is provided to field memory 30 or to a video monitor in the correct reverse order (i.e., 10, 12, 14, 16). Thus, in a normal playback mode, the field memory is continually updated.

FIG. 4(b) shows a "freeze frame" special effect mode in which movement of the optical tape is stopped and the video information in the field memory read to the display. Because information is not continuously updated in the field memory, the video information which is readout remains the same and, hence, any display of the information remains unchanged.

FIG. 4(c) illustrates use of the field memory 30 for a fast-forward scan wherein only video information that has been stored in the field buffer is read out for displayed. In this case, where the playback head traces over the optical tape at a velocity substantially greater than the normal playback speed, only a fraction of the television horizontal scan lines from each recorded frame are read and used to update address locations in the field memory 30. However, even though traces over adjacent frames pick up entirely newly recorded video information, this read information can be placed in a proper location in field memory 30 (i.e., the location corresponding to different horizontal scan lines) by making use of the identification information recorded at the edges of the optical recording medium. For the address locations in the field memory which are not updated for a currently read frame, the previously read video information is retained. Thus, while the entire field memory is read out for display, the information stored therein is updated in pieces using the video information recorded in and read from a number of frames stored on the optical tapes.

The use of a field memory as described above provides clear still television pictures. Further, a high quality representation of recorded video information can be displayed in a fast forward scan mode where there is relatively little or no motion in the recorded image, and improved representations of recorded images can be obtained in the fast forward scan mode where the originally recorded image depicts motion.

It will be appreciated that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description, and all the changes that come within the meaning and range and equivalents, thereof are intended to be embraced therein. For example, the invention can be used with conventional magnetic tape provided modifications are implemented to accommodate the format with which video information is recorded on the tape.

I claim:

1. Method of reading digital video information recorded on an optical recording medium moving at a given speed comprising the steps of:

scanning a fraction of a video signal field stored on the recording medium during a scan cycle with an optical sinusoidal trace over the recording medium, said scanning being performed at a speed selected to have a predetermined relationship with said given speed such that a predetermined fraction of the video signal field is scanned;

reading data during the scan cycle, the data including video signal information and video signal identification information; and storing at least a portion of the read video signal information in a field memory at a location identified by the video signal identification information.

2. Method according to claim 1, wherein the scanning is executed at a speed relative to the recording medium speed such that all video signal information associated with a video signal field stored in said field memory is updated during consecutive scan cycles.

3. Method according to claim 1, wherein the scanning is executed at a scanning speed relative to the recording medium speed such that less than all of the video signal information associated with a video signal field stored in said field memory is updated during a complete update cycle of the field memory.

4. Method according to claim 1, wherein the scanning speed is selected relative to the recording medium speed such that video signal information associated with a single field of video signal information stored in said field memory is obtained from successive video signal fields stored on the recording medium.

5. Method according to claim 1, further comprising the step of updating a field of the video signal information stored in the field memory with video information from a field of video signal information scanned and read from the recording medium.

6. Method according to claim 5, wherein the field of video signal information updated in said field memory corresponds to a single field of video information recorded on the recording medium.

7. Method according to claim 5, wherein a single field of video signal information updated in said field memory includes video signal information from a plurality of successive fields of video information recorded on the recording medium.

8. Method according to claim 7, wherein said step of scanning includes a step of selecting said scanning speed such that all horizontal scan lines in a field of video information stored in said field memory are updated once before any one horizontal scan line is updated twice.

9. Method according to claim 8, wherein video signal information stored in the field memory is updated in a predetermined order by television line numbers associated with recorded video information.

10. Method according to claim 8, wherein video signal information is updated from a lowest to a highest television line number in the field.

11. A system for recording and reading digital video information stored on an optical recording medium comprising:

means responsive to a scan signal for reading a predetermined fraction of a field of digital video information stored on an optical recording medium by scanning the optical recording medium with an optical sinusoidal trace at a speed selected to have a predetermined relationship relative to a speed of said optical recording medium, the digital video information further including information identifying at least one horizontal scan line number associated with the video information; and means for storing the digital video information as a field of video signal information.

12. System according to claim 11, wherein digital information from a plurality of fields of video signals recorded on the optical recording medium is used to update a single field of video signal information in the storing means, with all horizontal scan lines stored in said storing means being updated once before any horizontal scan line in the storing means is updated twice.

13. Method of recording and reading digital video information on an optical recording medium moving at a given speed comprising the steps of:

storing less than all horizontal scan lines of a video signal field in a track of the optical recording medium;

storing information in the optical recording medium track to identify at least one of the video signal field scan lines stored in the optical recording medium track; and scanning horizonal scan lines from a fraction of each of plural video signal fields stored on said optical recording medium using an optical sinusoidal trace, said horizontal scan lines from a fraction of each of said plural video signal fields being scanned in a predetermined order to obtain a single updated video signal field.

14. Method according to claim 13, wherein the information identifies the first video signal field scan line stored in the optical recording medium scan line.

15. Method according to claim 14, wherein the information further identifies the last video signal field scan line stored in the optical recording medium track.

16. Method according to claim 13, wherein said horizontal scan lines of said plural video signal fields are scanned such that all horizontal scan lines of said single video signal field are updated once before any horizontal scan line of said single video signal field is updated more than once.

* * * * *